United States Patent [19]

Dobson

[11] Patent Number: 4,867,510

[45] Date of Patent: Sep. 19, 1989

[54] DEVICE AND METHOD FOR DOUBLING THE FREQUENCY OF ELECROMAGNETIC RADIATION OF A GIVEN FREQUENCY

[75] Inventor: Peter J. Dobson, South Croydon, England

[73] Assignee: U.S. Philips Corp., New York, N.Y.

[21] Appl. No.: 325,029

[22] Filed: Mar. 16, 1989

Related U.S. Application Data

[63] Continuation of Ser. No. 22,153, Mar. 5, 1987, abandoned.

[30] Foreign Application Priority Data

Mar. 7, 1986 [GB] United Kingdom ................. 8605659

[51] Int. Cl.⁴ ............................................... G02B 1/00
[52] U.S. Cl. .................................. 307/427; 350/96.12; 372/22
[58] Field of Search .......................... 350/96.11–96.14, 350/96.19, 96.29; 307/425, 427, 430; 372/21, 22, 96

[56] References Cited

U.S. PATENT DOCUMENTS 3,831,038  8/1974  Dabby et al. ................. 307/430
3,935,472  1/1976  Bethea et al. ................. 350/96.12
4,178,604  12/1979 Nakamura et al. .............. 372/96
4,427,260  1/1984  Puech et al. .................. 307/427

FOREIGN PATENT DOCUMENTS 0023383 1/1986 Japan ..................................... 372/96

OTHER PUBLICATIONS

"Surface Plasmas in Thin Films", Physical Review, vol. 182, No. 2, 1969.

Primary Examiner—William L. Sikes
Assistant Examiner—B. R. R. Holloway
Attorney, Agent, or Firm—William L. Botjer

[57] ABSTRACT

A device and method for doubling the frequency of electromagnetic radiation of a given frequency are described. The device comprises a substrate (1) on which is provided a first layer (2) and a second layer (3). One of the first and second layers (2) has a plasma oscillation frequency equal to the given frequency for causing an electric field at twice the given frequency to be produced across the device in response to electromagentic radiation at the given frequency being incident on the device normally of the first and second layers (2and 3). A thus-produced electric field is converted to electromagnetic radiation at twice the given frequency by the said other of the first and second layers (3) which forms a waveguide for electromagnetic radiation at twice the given frequency. A further layer (2') similar to the said one layer (2) may be provided so that the said other layer (3) is sandwiched between the said one and further layers (2 and 2').

12 Claims, 1 Drawing Sheet

DEVICE AND METHOD FOR DOUBLING THE FREQUENCY OF ELECROMAGNETIC RADIATION OF A GIVEN FREQUENCY

This is a continuation of application Ser. No. 022,153, filed Mar. 5, 1987 now abandoned.

BACKGROUND OF THE INVENTION

The invention relates to a device and method for doubling the frequency of electromagnetic radiation of a given frequency.

It is well known that non-linear optical effects can be produced in crystals (for example $LiNbO_3$, $\alpha$-Quartz, Tourmaline) for which the second order non-linear dielectric susceptibility is not zero, that is birefringent crystals which do not have a centre of inversion symmetry. Such crystals exhibit, under certain conditions, phenomena such as sum and difference frequency generation, second harmonic generation (frequency doubling) and parametric amplification and oscillation of electromagnetic radiation input to the crystal. In order to obtain frequency doubling or second harmonic generation using such non-linear crystals, it is necessary to ensure phase-matching between the input electromagnetic radiation and the frequency doubled electromagnetic radiation. Thus the refractive indices at the input frequency and the doubled frequency in the crystal must be equal. Accordingly to ensure phase-matching, a direction at an angle to the axis or axes of symmetry of the birefringent crystal must be selected at which the refractive index at the input frequency for the ordinary ray is equal to the refractive index at double the input frequency for the extraordinary ray so that when electromagnetic radiation at the desired input frequency is input to the crystal at that selected angle to the axis or axes of symmetry, an extraordinary ray at twice the input frequency is generated along the same direction as the input ordinary ray. Accordingly, it will be seen that precise orientation of the non linear crystal is needed to obtain the required phase-matching. Moreover, the frequency doubling process using such non-linear crystals is not particularly efficient and a powerful laser input is normally required to obtain good results.

SUMMARY OF THE INVENTION

It is an object of the present invention to overcome or at least mitigate the above-mentioned problems.

According to a first aspect of the present invention, the device for doubling the frequency of electromagnetic radiation of a given frequency is characterised in that the device comprises a first layer provided on a substrate and a second layer provided on the first layer, one of the first and second layers having a plasma oscillation frequency for causing an electric field at twice the given frequency to be produced across the device in response to electromagnetic radiation of the given frequency being incident on the device normally of the first and second layers, and the other of the first and second layers forming a waveguide for electromagnetic radiation of twice the given frequency generated in the said other layer in response to the said electric field.

At least one major surface of the said other layer may be provided with a periodic structure having a period $\Lambda = \lambda_i/4N_B$, where $\lambda_i$ is the wavelength of electromagnetic radiation of the given frequency and $N_B$ is the refractive index of the said other layer at a wavelength of $\lambda_i/2$, to ensure coupling out of electromagnetic radiation at twice the given frequency.

The periodic structure may comprise corrugations or undulations formed in a major surface of the said other layer, for example sinusoidal corrugations or undulations. Alternatively, the periodic structure may comprise a periodic metallic structure overlaid on a major free surface of the second layer or a photo-excitable carrier provided on a major free surface of the second layer, a desired periodic grating being provided in the carrier by interfering electromagnetic radiation beams incident on the carrier.

A further layer similar in composition to the said one layer may be provided so that the said other layer is sandwiched between the said one and the said further layers. Where the second layer is the said other layer, the interface between the second and further layers and a major free surface of the further layer may both have a periodic structure so that the further layer is of substantially uniform thickness.

The said one layer may be formed of doped indium tin oxide or of sodium tungstate and the said one and the further layers may be approximately 1000 Å thick while the said other layer may be formed of alumina or silica and may be approximately 1230 Å thick.

The present invention also provides a method of obtaining electromagnetic radiation at twice a given frequency, which method comprises causing electromagnetic radiation of the given frequency to be incident on a device in accordance with the first aspect normally of the said first and second layers.

BRIEF DESCRIPTION OF THE DRAWING

In order that the invention may be more readily understood, an embodiment thereof will now be described, by way of example, with reference to the accompanying drawings, in which.

DETAILED DESCRIPTION OF THE PREFERRED EMBODIMENT

Figure 2:
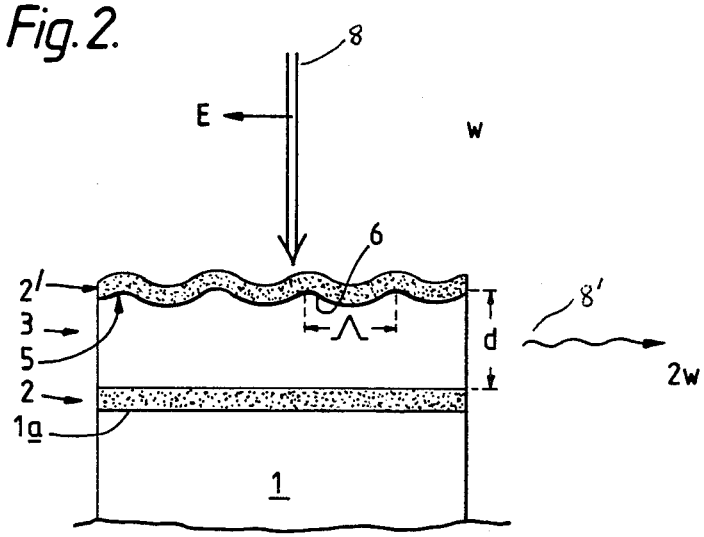
FIG. 2 illustrates schematically, and not to scale, a device embodying the invention.

Referring now to the drawings, FIG. 2 illustrates diagrammatically a device embodying the invention for doubling the frequency of electromagnetic radiation input thereto.

As shown in FIG. 2, the device comprises a substrate 1 having a flat major surface 1a on which are formed successive first and second layers 2 and 3. In the arrangement shown in FIG. 2 the first layer 2 is formed of a first active material having a plasma oscillation frequency equal or nearly equal to a given frequency desired to be doubled. The various plasmon modes are discussed in a paper by E. N. Economou published in Physical Review 182 page 539 1969. The second layer 3 is formed of a second material having a low absorption for electromagnetic radiation of twice the given frequency, the second layer having a mean thickness $d \geq \lambda_i/4N_B$ (where $\lambda_i$ is the wavelength of electromagnetic radiation at the given frequency and $N_B$ is the refractive index of the second layer at the wavelength $\lambda_i/2$) so as to form a waveguide for frequency doubled electromagnetic radiation. A further first layer 2 may be formed on the second layer 3 as shown in FIG. 2.

As shown in FIG. 2, a major surface 5 of the second layer 3 may be formed, possibly by etching, with a periodic structure 6 in the form of sinusoidal corrugations or undulations having a period $\Lambda = \lambda i/4N_B$ (where $\lambda_i$ is the wavelength of the incident electromagnetic radiation and $N_B$ is the refractive index of the waveguide second layer 3 at a wavelength of $\lambda i/2$). The further first layer 2' may be similarly corrugated as shown in FIG. 2. The depth of the corrugations should be small, approximately $\lambda/10$, to avoid scattering losses.

The periodic structure 6 shown in FIG. 2 is provided to provide optical feedback to give a directional output 8' and improve the efficiency and coupling of the frequency doubled (2) electromagnetic radiation.

In a particular example, the first layers 2 and 2' may be of mean thickness 1000 Å to provide for optimum absorption of the incident electromagnetic radiation while the second layer may be of mean thickness 1230 Å. The first layers 2 and 2' may be formed of indium tin oxide doped to produce a carrier concentration of approximately $3 \times 10^{21}$ cm$^{-3}$, or alternatively sodium tungstate may be used. An advantage of using indium tin oxide is that the plasma frequency of the first layers 2 and 2' may then be tuned from the infra-red to the visible wavelengths by varying the tin concentration of the first layers. Another possible material for the first layers 2 and 2' is lead ruthenium oxide which also has a tuneable plasma frequency. The second waveguide layer 3 may be formed of, for example, alumina or silica.

The first and second layers 2, 2' and 3 may be formed on the substrate 1 using any suitable conventional layer forming process used in the semiconductor field, for example molecular beam epitaxy.

Of course, although in the arrangement shown in FIG. 2, only three layers are formed on the substrate 1, the number of layers could be increased to provide any desired number of alternate first and second layers.

Although in the arrangement shown in FIG. 2, the first layer 2 is the active layer formed of the first material and the second layer 3 is the waveguide layer formed of the second material, the arrangement of the layers on the substrate could be reversed when the substrate is formed of an appropriate material to enable waveguide operation of the waveguide layer. In such an arrangement the further first layer 2' would not be provided.

As an alternative to the corrugated or undulating periodic structure, where the further first layer 2' is not provided, the free upper major surface 5 of the second layer 3 may be planar and may have a periodic structure formed by, for example, a periodic metallic structure overlaid on the surface 5 or by the provision on the surface 5 of a photo-excitable carrier in which a desired periodic grating is produced by interfering electromagnetic radiation beams incident on the carrier.

The operation of the device shown in FIG. 2 will now be explained with reference to FIG. 1, in which the device shown in FIG. 2 is represented schematically by a right parallelopiped slab 7.

Figure 1:
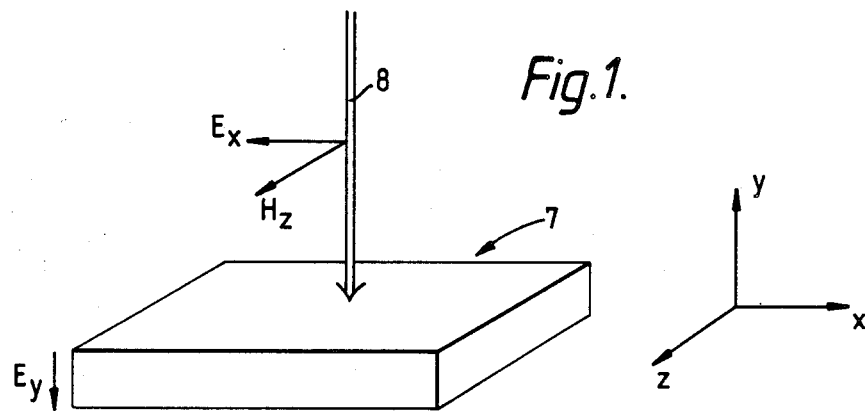
FIG. 1 shows a diagram to illustrate the manner in which a device embodying the invention operates.

Thus, as shown in FIG. 1, polarised electromagnetic radiation 8 at the given frequency w (for example light from a dye laser at approximately 740 nm where the first layers are formed of indium tin oxide and the second layer(s) of silica or alumina) is incident normally on the free surface 5 of the uppermost first layer 2'. The electric field vector Ex is, as shown, along the x-direction (parallel to the direction of corrugation in FIG. 2) and the corresponding magnetic field vector $H_z$ is shown to be along the z-direction (parallel to the corrugations in FIG. 2).

When the electromagnetic radiation 8 incident normally on the surface 5 has a frequency w equal to the plasma frequency for the first layers 2 and 2', the electrons in the first layers tend to vibrate in unison with the incident electric field vector Ex. The microscopic movement of the electrons in the first layers will, under the influence of the magnetic field produced by the incident electromagnetic radiation, produce an electric field Ey across the device as shown in FIG. 1 because of the Hall effect. The thus-produced electric field Ey is proportional to $-J_x B_z$ where $J_x$ is the induced current resulting from the electrons in the first layers oscillating in unison with the incident electric field vector $E_x$, and $B_z$ is the magnetic flux density.

$$\text{Now } J_x = \sigma E_x$$
$$= \sigma E_o \sin wt$$

where $\sigma$ is the (optical) conductivity and w is the angular frequency of the incident electromagnetic radiation $2\pi c/\lambda i$ where $\lambda_i$ is the wavelength of the incident electromagnetic radiation and c is the velocity of light in vacuo, $$\text{and } B_z = \mu\mu_o H_z$$
$$= \mu\mu_o H_o \sin wt$$

where $\mu_o$ is the permeability of free space and $\mu$ is the relative permeability of first layers.

By the Hall Effect $E_y = E_x \cdot B_z$ $$\text{thus: } E_y = -\sigma E_o H_o \mu\mu_o \sin^2 wt$$

$$\text{i.e. } E_y = \frac{-\sigma E_o H_o \mu\mu_o}{2}(1 - \cos 2wt)$$

Thus an electric field $E_y$ at twice the given frequency is generated across the device by electromagnetic radiation at the given frequency w being incident on the first layer 2'. The electric field $E_y$ is converted to electromagnetic radiation (at a wavelength of approximately 370 nm if the incident wavelength is approximately 740 nm) in the waveguide layer 2, the periodic structure 6, if provided, serving to provide optical feedback to provide a directional output.

As will be appreciated, the device described above enables frequency doubling of electromagnetic radiation without the need for non-linear crystals and, because the device depends on the frequencies at which the incident radiation can couple to electrons in the first layers to excite plasma oscillations, in principle a wide range of wavelengths from 82.6 nm (plasma energy ~15 eV) to 247 $\mu$m (plasma energy ~5 meV) can be encompassed, the wavelength of operation of a particular device being of course determined by the composition of the first layer(s).

Such a device has wide applications for example for converting infra-red electromagnetic radiation used for lasers in telecommunications (1.3 to 1.5 $\mu$m wavelength) to visible electromagnetic radiation (0.65 to 0.75 $\mu$m wavelength), for shifting the wavelength of long wavelength lasers to shorter and more easily detectable wavelengths and for producing new short wavelength sources for existing excimer lasers which have wavelengths in the 1200 Å and 800 Å range. Such a device may also be used in, for example, infrared imaging equipment to enable a visible image of the infrared image detected by the equipment to be produced.

I claim:

1. A device for doubling the frequency of electromagnetic radiation of a given frequency comprising:
   (a) a substrate;
   (b) a first layer disposed on said substrate;
   (c) a second layer disposed on said first layer;
   (d) at least one of said first and said second layers being an non-linear optically active layer and having a plasma oscillation frequency for causing an electric field to be produced across the device at twice the frequency of electromagnetic radiation being incident on said device in a direction normal to said first and said second layers; and
   (e) the other of said first and second layers forming a waveguide layer, said waveguide layer acting as a waveguide for electromagnetic radiation of twice said given frequency generated in said active layer in response to said electric field.

2. A device according to claim 1, characterised in that at least one major surface of the said waveguide layer is provided with a periodic structure having a period $\Lambda = \lambda_i/4N_B$, where $\lambda_i$ is the wavelength of electromagnetic radiation of the given frequency and $N_B$ is the refractive index of the waveguide layer at a wavelength of $\lambda i/2$.

3. A device according to claim 2, characterised in that the periodic structure comprises undulations formed in a major surface of the waveguide layer.

4. A device according to claim 3, characterised in that the periodic structure comprises sinusoidal undulations.

5. A device according to claim 1, characterised in that a third layer similar in composition to the said first layer is provided so that the said waveguide layer is sandwiched between the said first and the said third layers.

6. A device according to claim 3, characterised in that the second layer is the waveguide other layer and a further layer of substantially uniform thickness is provided on the second layer, the further layer being of similar composition to the first layer and the interface between the second and further layers being provided with a periodic structure.

7. A device according to claim 2, characterised in that the said waveguide layer is the second layer and the periodic structure comprises a periodic metallic structure overlaid on a major free surface of the second layer.

8. A device according to claim 2, characterised in that the said waveguide layer is the second layer and the periodic structure comprises a photo-excitable carrier provided on a major free surface of the waveguide layer, a periodic grating being provided in the carrier by interfering electromagnetic radiation beams incident on the carrier.

9. A device according to claim 1 characterised in that the said active layer is formed of at least one of doped indium tin oxide and sodium tungstate.

10. A device according to claim 1, characterised in that the said first layer is approximately 1000 Å thick.

11. A device according to claim 1 characterised in that the waveguide layer is formed of at least one of alumina and silica.

12. A device according to any one of the preceding claims, characterised in that the waveguide layer has a mean thickness of approximately 1230 Å.

* * * * *

UNITED STATES PATENT AND TRADEMARK OFFICE
CERTIFICATE OF CORRECTION

PATENT NO. : 4,867,510

DATED : September 19, 1989

INVENTOR(S) : PETER J. DOBSON

It is certified that error appears in the above-identified patent and that said Letters Patent is hereby corrected as shown below:

In the title change "ELECROMAGNETIC" to --ELECTROMAGNETIC--.

Signed and Sealed this

Thirty-first Day of July, 1990

Attest:

HARRY F. MANBECK, JR.

Attesting Officer      Commissioner of Patents and Trademarks